United States Patent [19]
Hoshiina et al.

[11] Patent Number: 5,995,964
[45] Date of Patent: Nov. 30, 1999

[54] MANAGING FIRST AND SECOND HANDLES USED IN COMMUNICATION WITH AN APPARATUS CONNECTED TO A NETWORK

[75] Inventors: Tsuyoshi Hoshiina; Junsei Sugino, both of Tokyo, Japan

[73] Assignee: Nihon Unisys, Ltd., Tokyo, Japan

[21] Appl. No.: 08/988,536

[22] Filed: Dec. 10, 1997

[51] Int. Cl.$^6$ .................................................. G06F 17/30
[52] U.S. Cl. .................................................. 707/6; 707/10
[58] Field of Search ............................... 707/6, 10, 101, 707/200, 205; 705/1; 395/200.57

[56] References Cited

U.S. PATENT DOCUMENTS

| | | | |
|---|---|---|---|
| 4,718,005 | 1/1988 | Feigenbaum et al. | 395/200.52 |
| 5,377,323 | 12/1994 | Vasudevan | 707/10 |
| 5,408,619 | 4/1995 | Oran | 707/10 |
| 5,434,974 | 7/1995 | Loucks et al. | 707/101 |
| 5,465,365 | 11/1995 | Trottier et al. | 395/200.56 |
| 5,513,351 | 4/1996 | Grantz | 707/200 |
| 5,706,501 | 1/1998 | Horikiri et al. | 707/10 |
| 5,732,219 | 3/1998 | Blumer et al. | 395/200.57 |
| 5,765,154 | 6/1998 | Horikiri et al. | 707/10 |

*Primary Examiner*—Paul R. Lintz
*Assistant Examiner*—Ella Colbert
*Attorney, Agent, or Firm*—Burns, Doane, Swecker & Mathis, LLP

[57] ABSTRACT

The number of openable file handles is limited by an OS. Simultaneously communicating partners are limited to, e.g., 64 systems. To solve this problem, a controller (202) of a communication control unit (201) assigns a virtual handle (Vj) in response to a request from a program (Pi) and manages a correspondence between a real handle (Rk) and the virtual handle (Vj) which is prepared by the OS. A program (Pn) of a group (H1) communicates with a program (P1') of a group (H2) using a real handle (R1) corresponding to a virtual handle (Vn). The controller 202 changes the correspondence between the real handle (Rk) and the virtual handle (Vj) to solve the shortage of the real handles (Rk).

16 Claims, 15 Drawing Sheets

RTi : CONNECTION TABLE OF REAL HANDLE Ri
MAXRTi : MAGNITUDE OF TRi
T : NUMBER OF GROUP TO BE CONNECTED
MAXRH : NUMBER OF REAL HANDLES

MANAGING FIRST AND SECOND HANDLES USED IN COMMUNICATION WITH AN APPARATUS CONNECTED TO A NETWORK

BACKGROUND OF THE INVENTION

1. Field of the Invention

The present invention relates to an information processing apparatus and method and, more particularly, to information processing apparatuses connected to a network to perform information communications with each other, and a communication method therefor.

2. Description of the Related Art

A plurality of information processing apparatuses such as personal computers and workstations connected to a network such as a LAN or WAN perform information communications with each other using a protocol such as the TCP/IP (Transmission Control Protocol/Internet Protocol).

In a communication using the TCP/IP, the operating system (OS) of an information processing apparatus opens a file handle corresponding to this communication. The file handle (to be also referred to as a handle hereinafter) is used to refer to a file or device opened by a program. The number of file handles is limited by an OS or the like. For example, the total number of processes (i.e., the total number of openable file handles) in a general OS such as UNIX(R) or Windows NT(R) is 64, which is not sufficiently large.

As described above, the number of openable file handles is limited by the OS, which poses the following problems.

(1) Limitation in simultaneous communications: in constructing systems for performing many-to-many communications, the partners subjected to simultaneous communications are limited to, e.g., 64 systems.

(2) Limitation in maximum process: when a large number of processes are simultaneously operated and the respective processes require communications, each process requires two file handles to perform bidirectional communications. For this reason, only a maximum of 32 processes can be operated simultaneously.

To solve the above problems, the OS itself may be improved. However, in order not to waste resources such as a main memory, the number of openable file handles must have a certain upper limit.

SUMMARY OF THE INVENTION

The present invention has been made to solve the above problems, and has as its object to provide an information processing apparatus and method capable of virtually preparing a large number of file handles.

To achieve the above object, a preferred embodiment of the present invention discloses an information processing apparatus connected to a network, said apparatus comprising: first management means for managing a first handle used in communication with any other apparatus connected to said network; and second management means for assigning a second handle in response to a request of an arbitrary computer program running on said apparatus and managing a correspondence between the first and second handles.

Also disclosed is a communication method of an information processing apparatus connected to a network, said method comprising the steps of: managing a first handle used in communication with any other apparatus connected to said network; assigning a second handle in response to a request of an arbitrary computer program running on said apparatus; and managing a correspondence between the first and second handles.

Further disclosed is an information processing system having a plurality of information processing apparatuses which are connected to a network, each of said plurality of information processing apparatuses comprising: first management means for managing a first handle used in a communication with any other apparatus connected to said network; and second management means for assigning a second handle in response to a request of an arbitrary computer program running on said apparatus and managing a correspondence between the first and second handles.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A preferred embodiment of an information processing apparatus and method according to the present invention will be described in detail with reference to the accompanying drawings.

General Description

Figure 1:
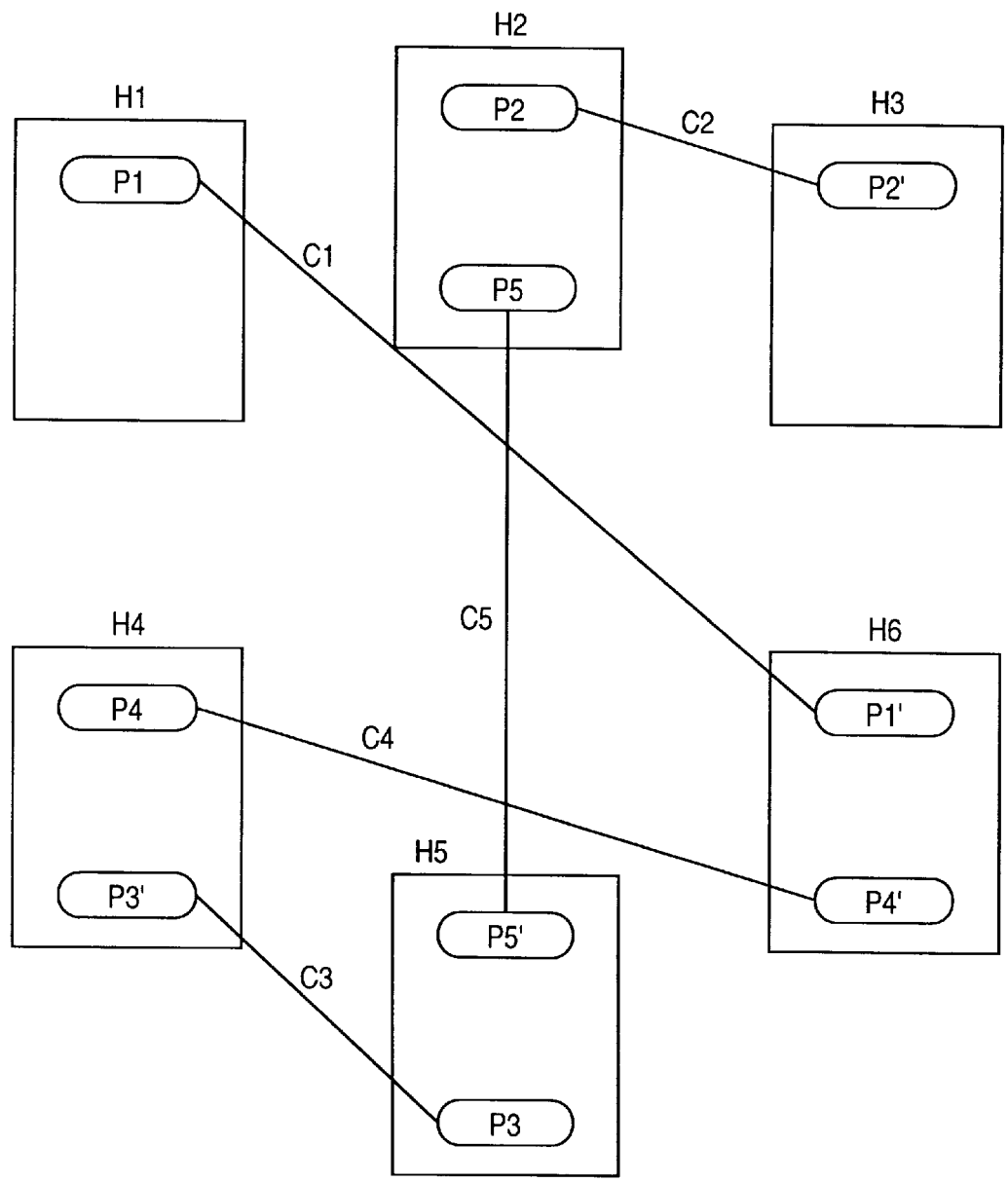
FIG. 1 is a block diagram showing a model for explaining an information processing apparatus and method according to an embodiment of the present invention.

FIG. 1 shows a communication model for explaining an information processing apparatus and method according to an embodiment of the present invention.

Referring to FIG. 1, reference symbol $P_i$ denotes a program. The program $P_i$ communicates with a program $P_i'$ through a connection (communication line) $C_i$ (the programs $P_i$ and $P_i'$ are symmetrical in terms of communication). Reference symbol $H_j$ is a group of programs $P_i$. For example, the group $H_j$ corresponds to, e.g., an information processing apparatus and an OS running on the information processing apparatus.

Figure 2:
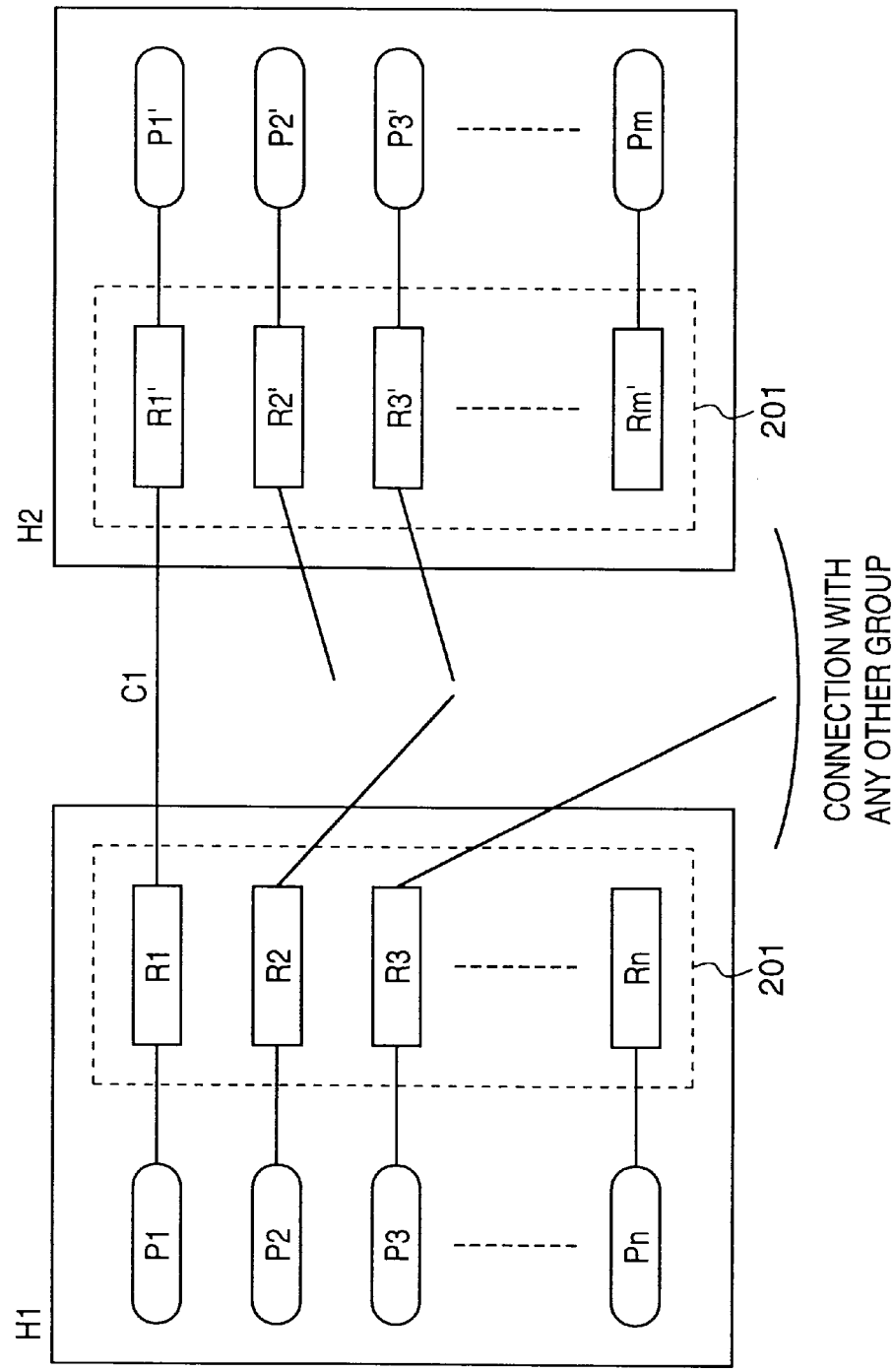
FIG. 2 is a block diagram for explaining a method of causing groups (apparatuses) to communicate with each other.

FIG. 2 is a block diagram for explaining a method of allowing communication between groups (apparatuses) H1 and H2.

As shown in FIG. 2, in communication between programs P1 and P1', handles R1 and R1' for establishing a connection C1 must be obtained by a communication control unit 201. As described above, to perform bidirectional communication between the programs P1 and P1', two file handles are used in each group. More specifically, two file handles are used as the handle R1, and two file handles are used as the handle R1'.

As described above, however, the number of file handles is limited by an OS and generally about 20 to 64. Therefore, if a connection requires more than 64 file handles between the groups H1 and H2, the communication control unit 201 cannot establish the connection between them.

Figure 3:
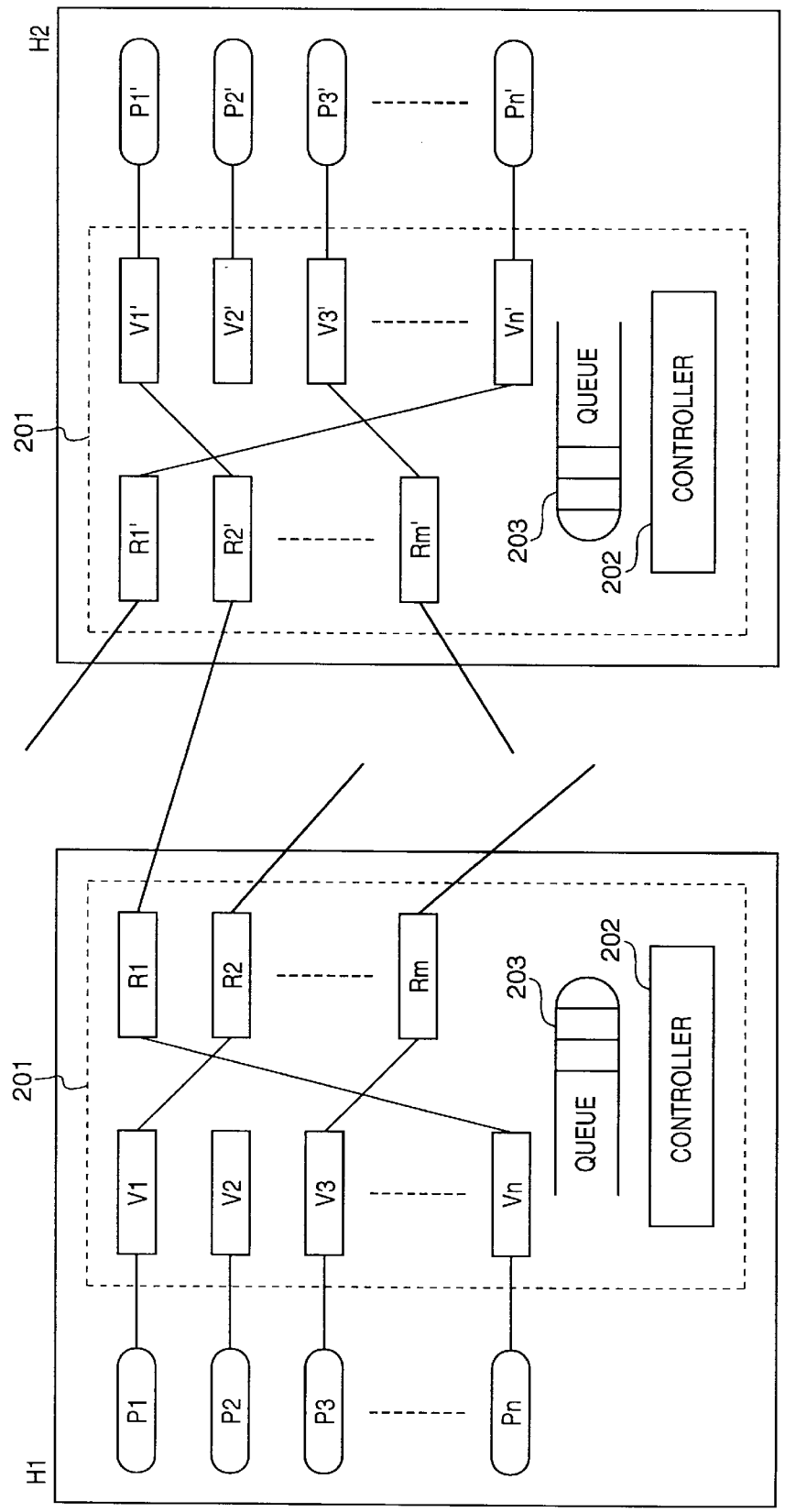
FIG. 3 is a block diagram for explaining virtual handles.

FIG. 3 is a block diagram for explaining virtual handles in this embodiment.

Referring to FIG. 3, a controller 202 in the communication control unit 201 prepares n virtual handles Vi in the memory. When a program Pj requests a handle, the controller 202 temporarily assigns the virtual handle Vi in response to this request. When actual communication is required, the controller 202 makes an available handle Rk correspond to the virtual handle Vi. A program Pn shown in FIG. 3 uses a virtual handle Vn, and a corresponding program P1' uses a virtual handle V1' to perform bidirectional communication. In this case, the handles used in practice are a handle R1 corresponding to the virtual handle Vn and a handle R2' corresponding to the virtual handle V1'. The actual handle Rk is called a "real handle" hereinafter.

Since the virtual handle Vi is prepared in the memory, the number of virtual handles can be prepared up to the memory capacity, as a matter of course. For this reason, the controller 202 dynamically manages the number of virtual handles in response to a request from the program Pj and assigns the virtual handle Vi, thereby establishing a large number of connections without being limited by the OS or the like. That is, the controller 202 adjusts the correspondence between the real handles Rk and the virtual handles Vj, thereby solving the shortage of the real handles Rk.

Final communication end time and the corresponding virtual handle number are stored in each real handle. If no virtual handle corresponding to a real handle is available (available real handle), "0" is stored as the corresponding virtual handle number. Group numbers to be connected, and the like are stored in the virtual handles, respectively.

A queue 203 of the communication control unit 201 stores data, its length, a connection destination group name Hi, and the like in the order of inputs from the program Pj. The input operations for the queue 203 are performed by the program Pj at arbitrary timings. Data stored in the queue 203 are transmitted by the controller 202 normally in the input order. However, skip transmission not agreeing with the input order may be performed in accordance with input/output handle determination processing (to be described later).

Communication Form

Figure 4:
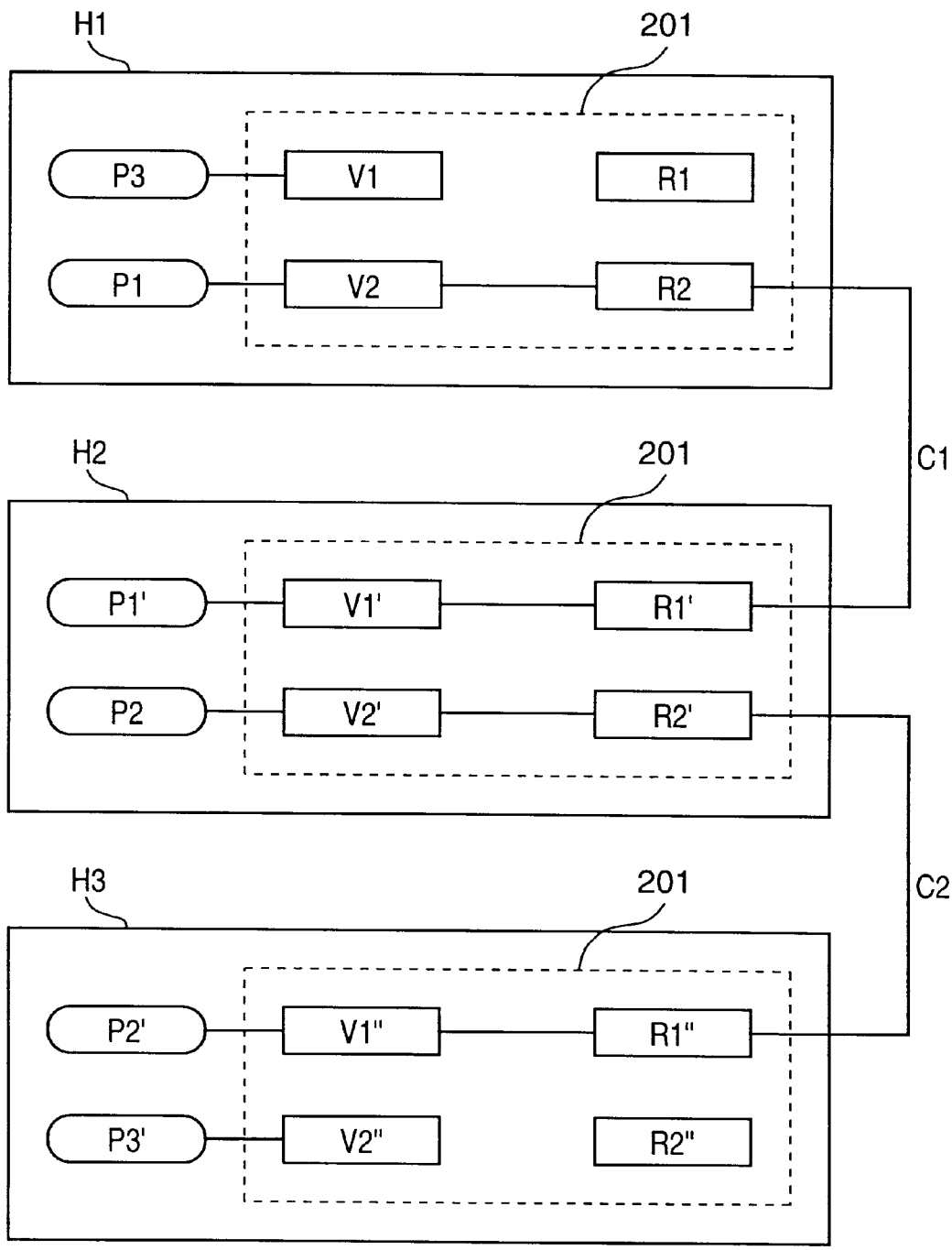
FIGS. 4 and 5 are block diagrams for explaining communication forms using the virtual handles.
Figure 5:
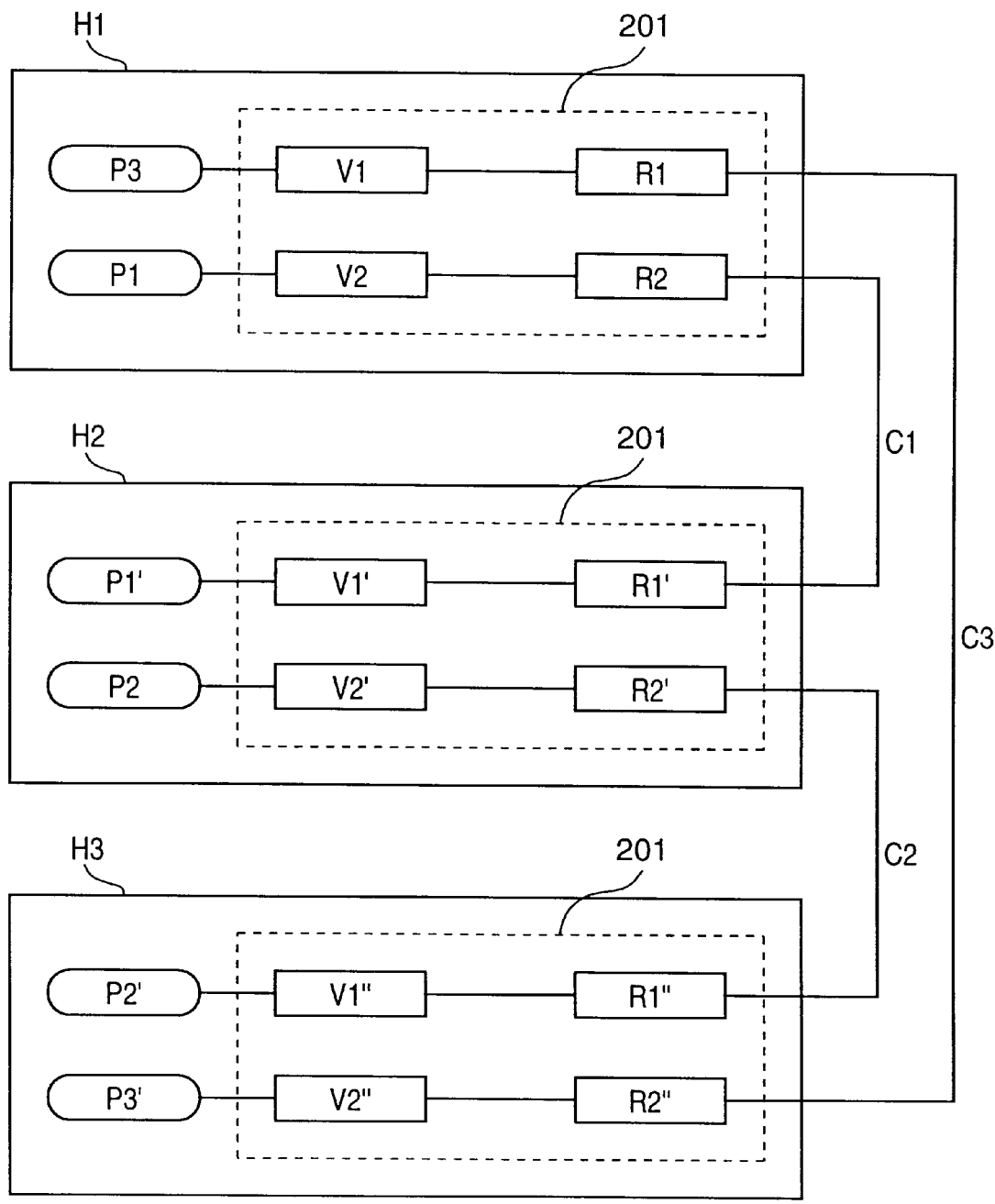
Figure 6:
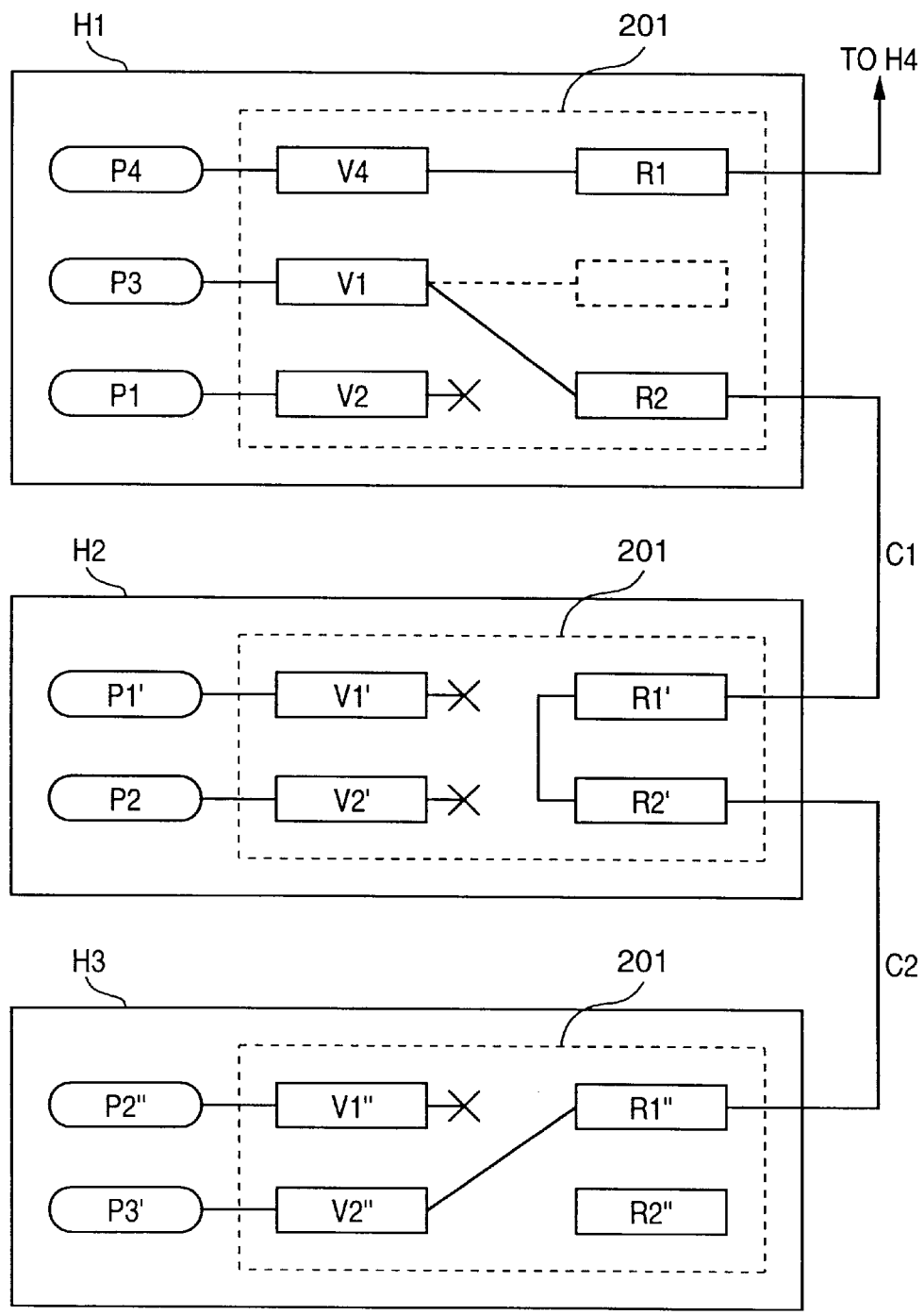
FIG. 6 is a block diagram for explaining a relay connection using the virtual handles.

FIGS. 4 to 6 are block diagrams for explaining the communication forms using virtual handles.

Assume that communication is being performed from a group H1 to a group H3, as shown in FIG. 4. That is, a program P1 of the group H1 uses a virtual handle V2 (real handle R2), a program P1' of a group H2 uses a virtual handle V1' (real handle R1'), and a connection C1 is established. In addition, a program P2 of the group H2 uses a virtual handle V2' (real handle R2'), a program P2' of the group H3 uses a virtual handle V1" (real handle R1"), and a connection C2 is established.

When actual communication is required between a program P3 of the group H1 to which the virtual handle V1 is assigned and a program P3' of the group H3 to which a virtual handle V2" is assigned, available real handles R1 and R2" are made to correspond to the virtual handles V1 and V2", respectively, so that a connection C3 is established.

As shown in FIG. 6, however, when the real handle R1 is already used in communication with a program P4, the real handle R1 cannot be used in communication with the program P3.

In this case, as shown in FIG. 6, in the group H1, the correspondence between the virtual handle V2 and the real handle R2 is temporarily canceled, and the virtual handle V1 is made to correspond to the real handle R2. At the same time, in the group H3, the correspondence between the virtual handle V1" and the real handle R1" is temporarily canceled, and the virtual handle V2" is made to correspond to the real handle R1". In addition, in the group H2, the correspondences between the virtual handles V1' and V2' and the real handles R1' and R2' are temporarily canceled, and the real handle R1' is made to correspond to the real handle R2'. Under these conditions, the programs P3 and P3' can communicate with each other through the existing connections C1 and C2. If necessary, as soon as the communication between the programs P3 and P3' is complete, the canceled correspondences can be restored.

The above connection, i.e., a connection using an existing connection in a shortage of real handles, is called a "relay connection". The relay connection is established using a virtual handle. Processing involving a relay connection including switching in correspondence between virtual and real handles is executed when the controllers 202 of the associated groups communicate with each other.

Figure 14:
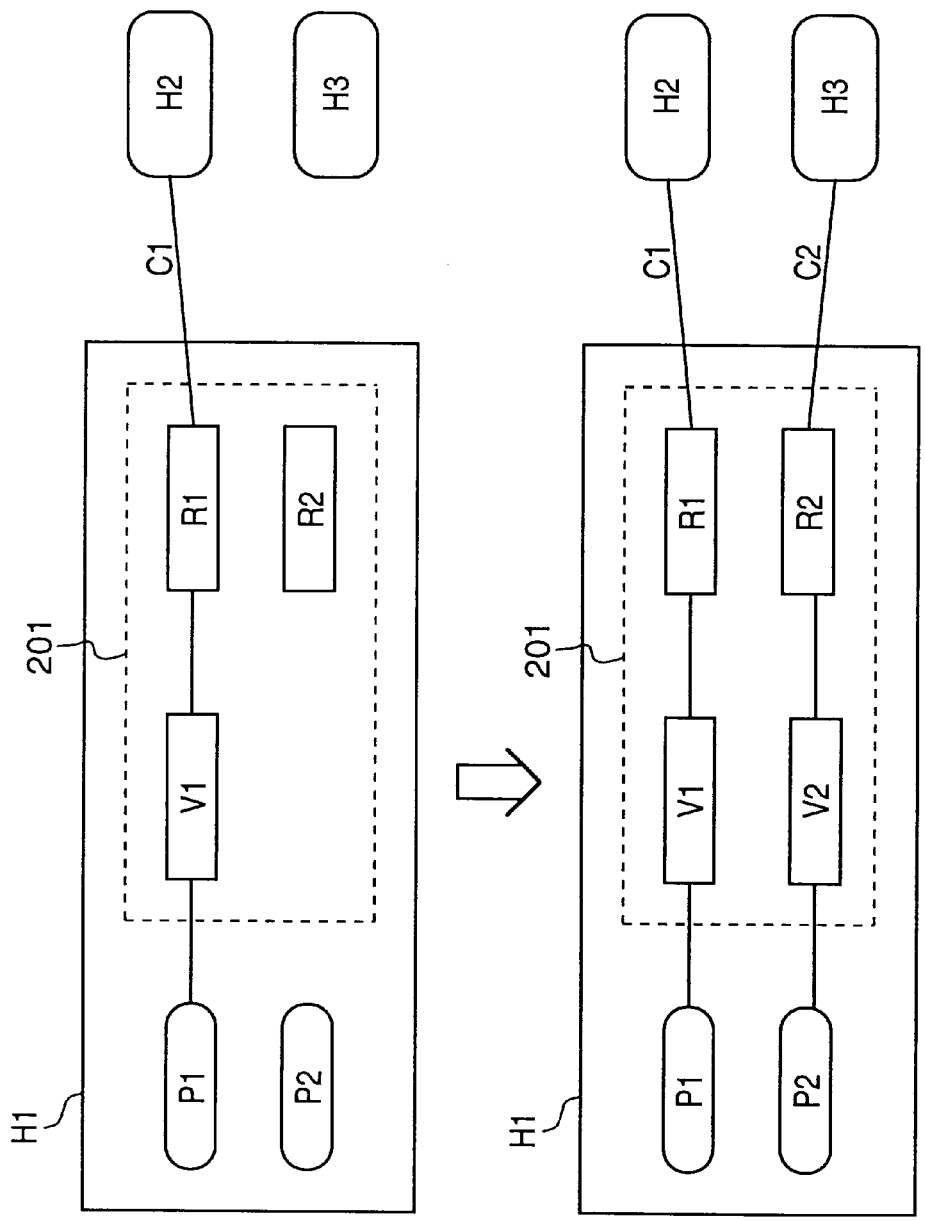
FIG. 14 is a block diagram for explaining a communication form using virtual handles.
Figure 15:
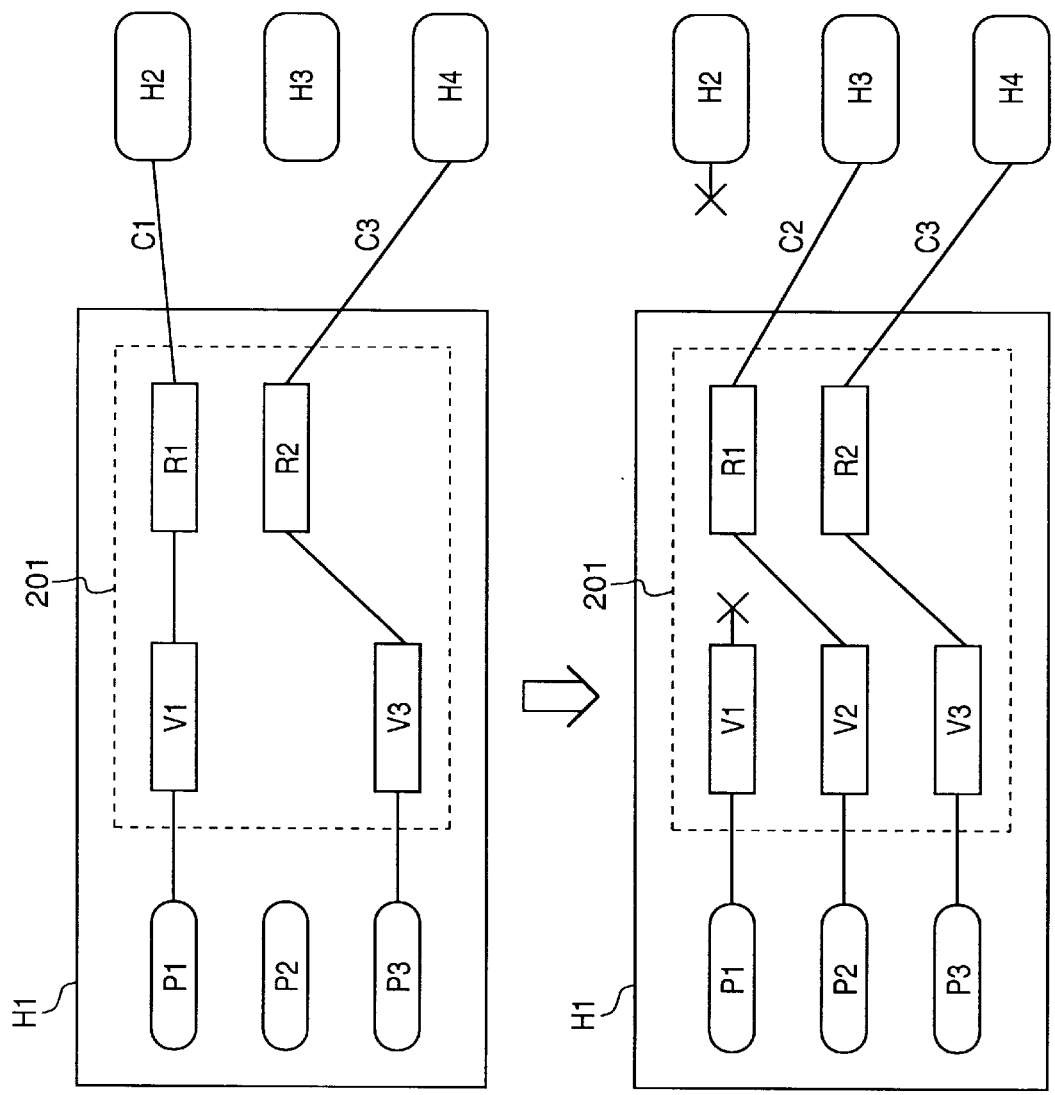
FIG. 15 is a block diagram for explaining simultaneous communication using virtual handles.

FIGS. 14 and 15 are block diagrams for explaining communication forms using virtual handles.

Assume that communication is being performed between groups H1 and H2, as shown in FIG. 14. That is, a program P1 of the group H1 communicates with the group H2 through a connection C1 using a virtual handle V1 (real handle R1).

When a program P2 of the group H1 is to establish a connection with a group H3, a connection C2 can be established using a virtual handle V2 and a real handle R2 because the real handle R2 is available, in the form of FIG. 14. In the form of FIG. 15, since a program P3 of the group H1 uses a virtual handle V3 (real handle R2) to have established a connection C3 with a group H4, no real handle is available.

As shown in FIG. 15, for example, in the group H1, the correspondence between the virtual handle V1 and the real handle R1 is temporarily canceled. In the group H2, the correspondence between the virtual and real handles corresponding to the connection C1 is temporarily canceled. In the group H1, the virtual handle V2 is made to correspond to the real handle R1 to establish the connection C2 with the group H3. If necessary, as soon as communication between the program P2 and the group H3 is complete, the disconnected connections can be restored. To establish the connection C2, the real handle R2 can be used. Which real handle is used will be described below.

The above connection is called "simultaneous communication". Even if real handles are short, such a connection can be established using of virtual handles. Connection switching processing including processing for temporarily disconnecting the virtual handle from the real handle can be executed when controllers 202 of the associated groups communicate with each other.

Connection Table

Figure 7:
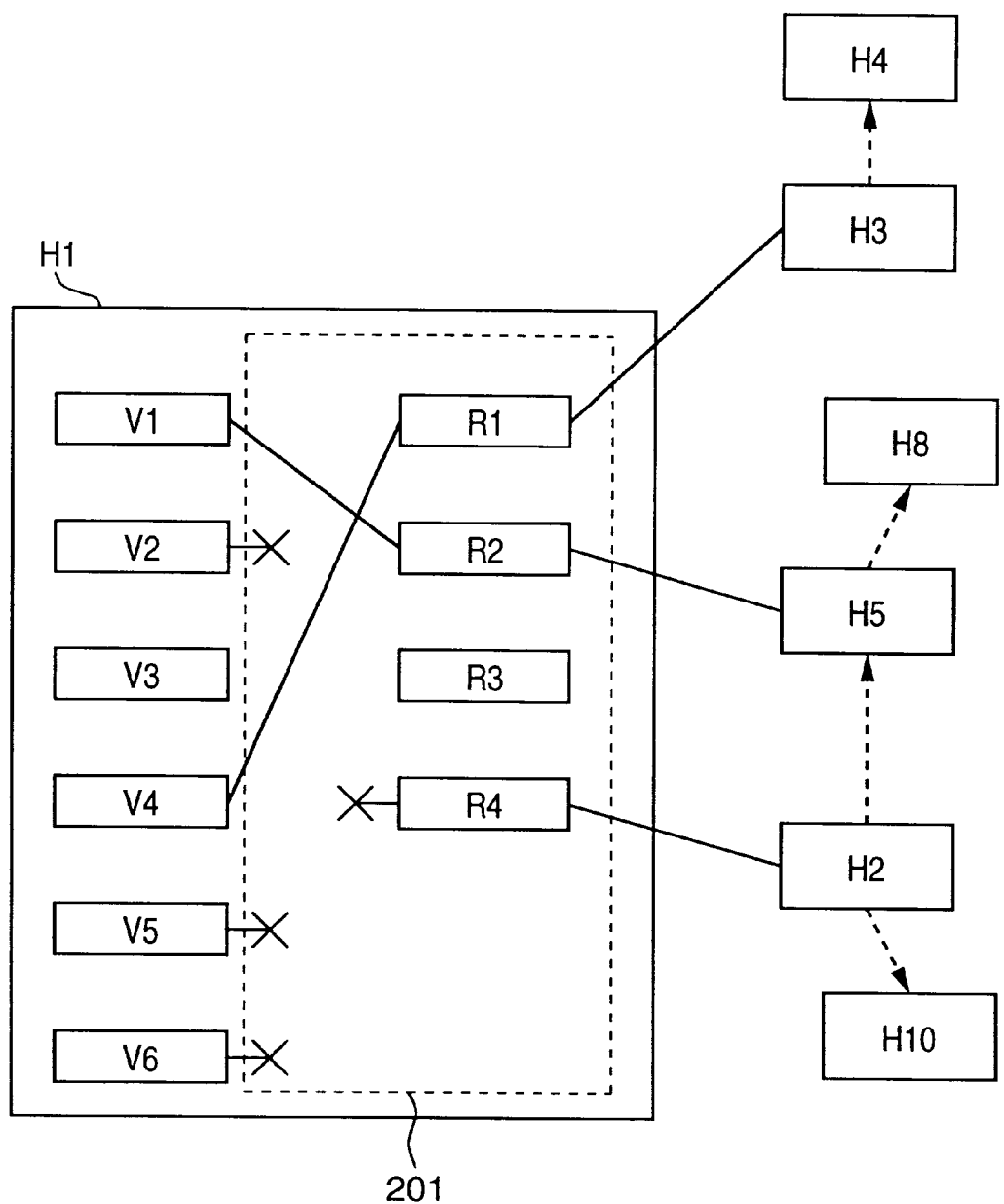
FIG. 7 is a block diagram for explaining a connection table.

This embodiment has a connection table so as to efficiently perform the above relay connection. FIG. 7 is a block diagram for explaining the connection table.

Referring to FIG. 7, a group H1 is connected to a group H3 using a real handle R1, to a group H5 using a real handle R2, and to a group H2 using a real handle R4. A connection table managed by a controller 202 of the group H1 is a minimum of {2, 3, 5}. The numbers in the braces represent the group numbers. The form of the connection table is not limited to this.

A group connected to the group H1 is further connected to any other group. In FIG. 7, the group H3 is connected to a group H4, the group H5 is connected to a group H8, and the group H2 is connected to the group H5 and a group H10. By referring to a connection table of a connection destination group, the connection table of the source group can be updated. In FIG. 7, when the controller 202 of the group H1 updates the connection table, the connection table becomes {2, 3, 4, 5, 8, 10}.

A connection table updating method, i.e., a method of determining an updating timing and a connection destination connection table of a specific hierarchical level which is to be referred to can be set in accordance with a control program in a connection control unit 201. Connection destinations which are or are not to be used in relay enable connection destinations registered in the connection table can be preset in a program Pi. For example, in FIG. 7, when a minimum connection table is used, a relay destination is selected from {2, 3, 5}; when a maximum connection table is used, a relay destination is selected from {2, 3, 4, 5, 8, 10}. For this reason, the efficiency of the relay connection changes depending on setting of a selectable relay destination. For example, the efficiency of the relay connection can be arbitrarily adjusted by the descriptions of the programs such that the selection width of programs Pi by which highly efficient communications are to be performed can be widened, and the selection width of programs Pj by which highly efficient communications are not required can be narrowed. Therefore, the communication efficiency of the entire system can be optimized.

As described above, this embodiment has a connection table representing a connection destination group. When a relay connection is required, the relay connection can be efficiently performed in such a manner that a shortest route is selected from a plurality of routes.

Processing Sequence

FIGS. 8 to 13 are flow charts showing processing sequences of this embodiment. These sequences are executed by the controller 202 of the communication control unit 201. Note that the controller 202 is constituted by a one-chip microcomputer including a program ROM, a work memory RAM, and a CPU.

Main Processing

Figure 8:
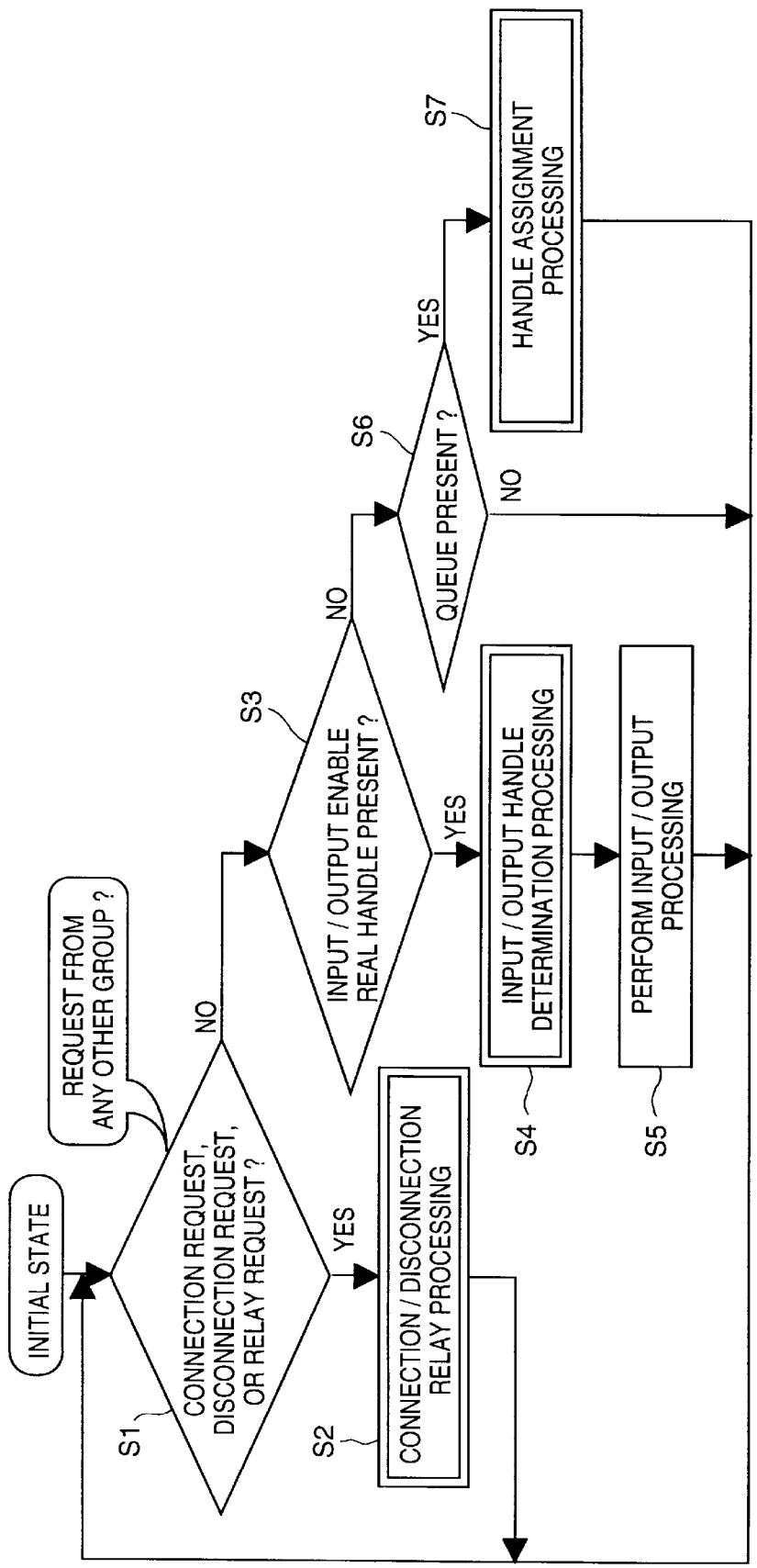
FIG. 8 is a flow chart showing a main processing sequence.
Figure 9:
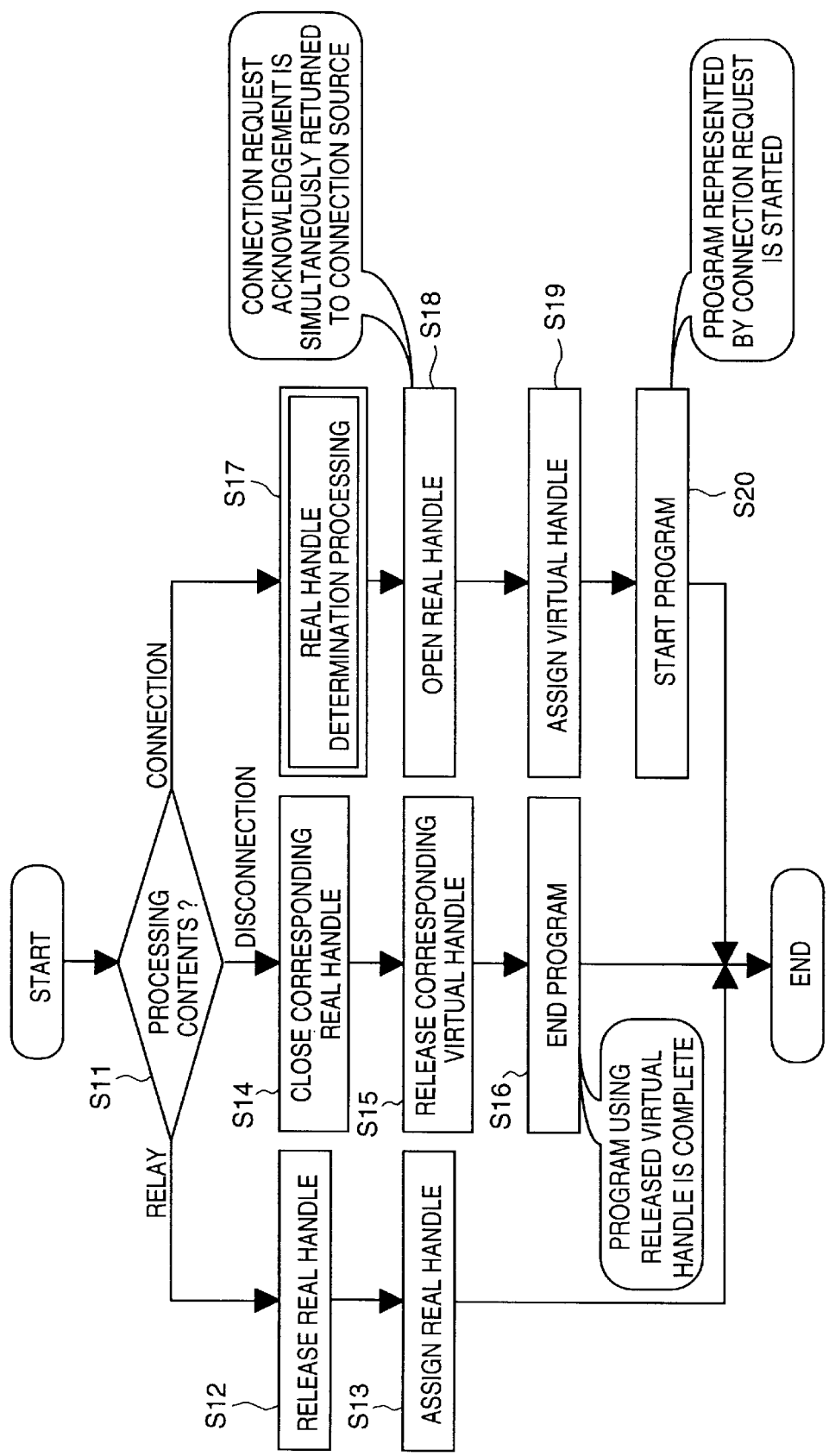
FIG. 9 is a flow chart showing a connection/disconnection/relay processing sequence.

In the flow chart of the main processing shown in FIG. 8, it is determined in step S1 whether a request from any other group is present. If a connection request, a disconnection request, or a relay request is detected, connection/disconnection/relay processing shown in FIG. 9 is executed in step S2. The flow then returns to step S1.

Figure 11:
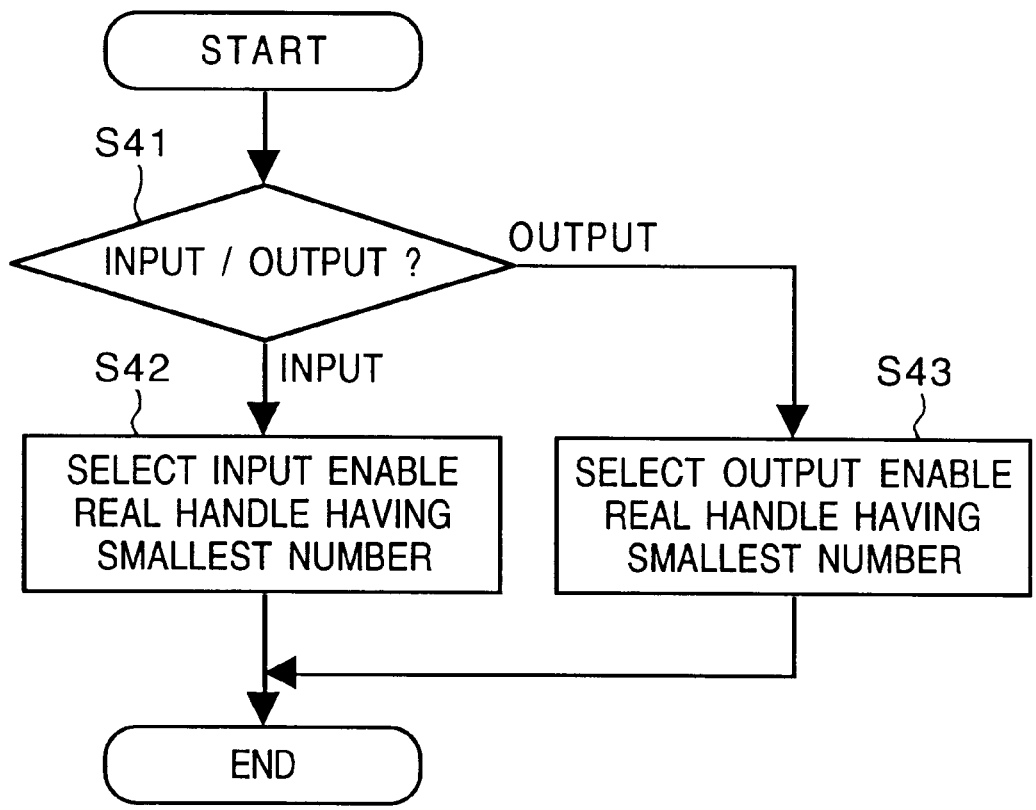
FIG. 11 is a flow chart showing an input/output handle determination processing sequence.

If NO in step S1, it is determined in step S3 whether an input/output enable real handle is present. If YES in step S3, input/output handle determination processing shown in FIG. 11 is executed in step S4, and input/output processing is executed in step S5. The flow then returns to step S1. Note that input/output processing is executed by any other program module on the basis of the request from the controller 202 and is processing for transmitting data stored in the queue 203 or receiving data from any other group.

Figure 12:
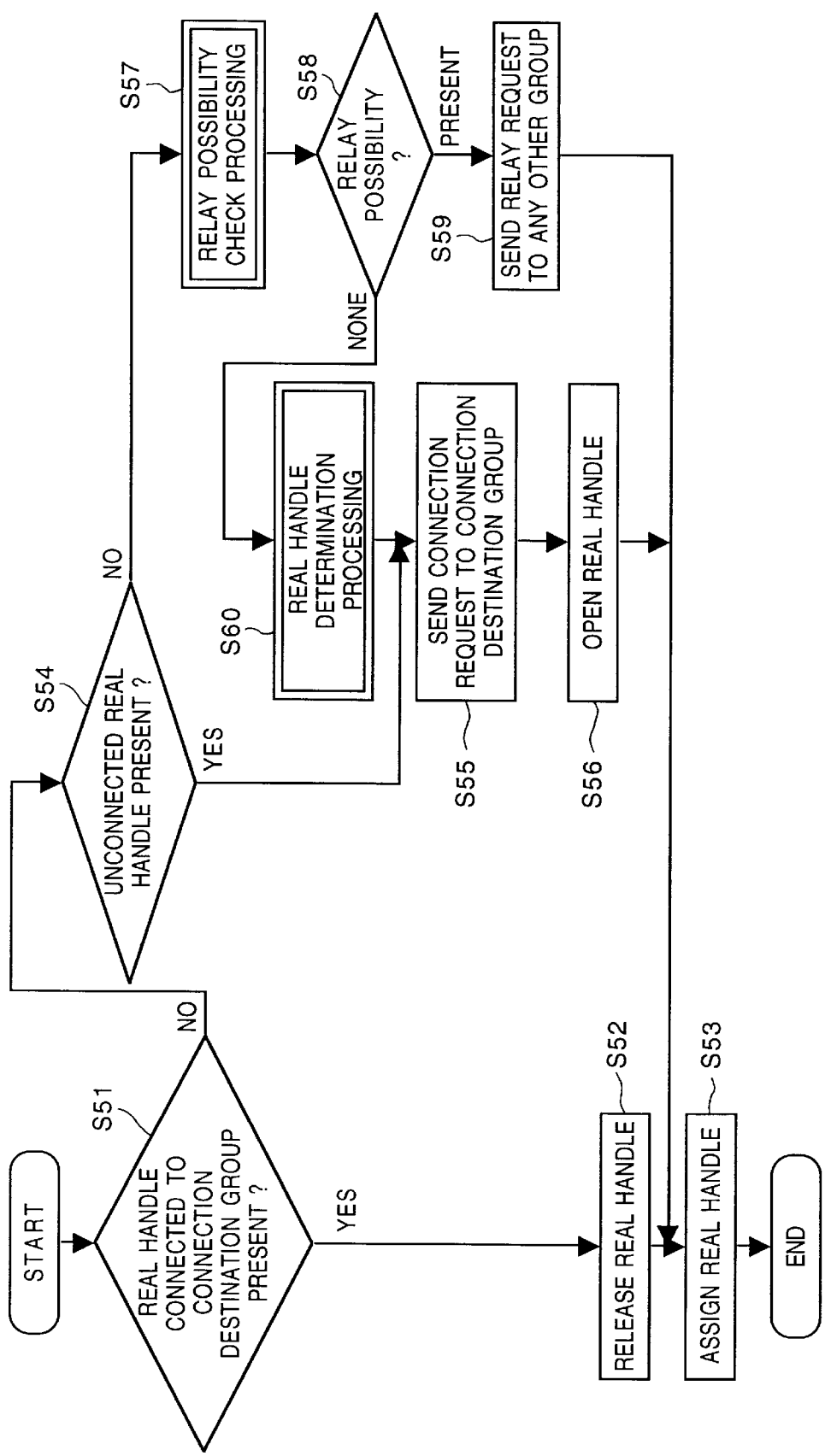
FIG. 12 is a flow chart showing a handle assignment processing sequence.

If no available handle is present, the flow advances to step S6 to determine whether data is stored in the queue 203. If NO in step S6, the flow directly returns to step S1. If data to be transmitted is stored in the queue 203, handle assignment processing shown in FIG. 12 is executed, and the flow then returns to step S1.

Connection/Disconnection/Relay Processing

Referring to FIG. 9, the flow branches in step S11 in accordance with the processing contents (request contents). If relay processing is requested, a real handle for performing a relay operation is released (disconnected from the corresponding virtual handle) in step S12, as shown in FIG. 6. After the released real handle is assigned for a relay connection, the flow returns to the main processing.

If disconnection processing is requested, the real handle corresponding to a connection to be disconnected is closed in step S14. In step S15, the virtual handle corresponding to the closed real handle is released. In step S16, a program using the released virtual handle is terminated, and the flow returns to the main processing.

Figure 10:
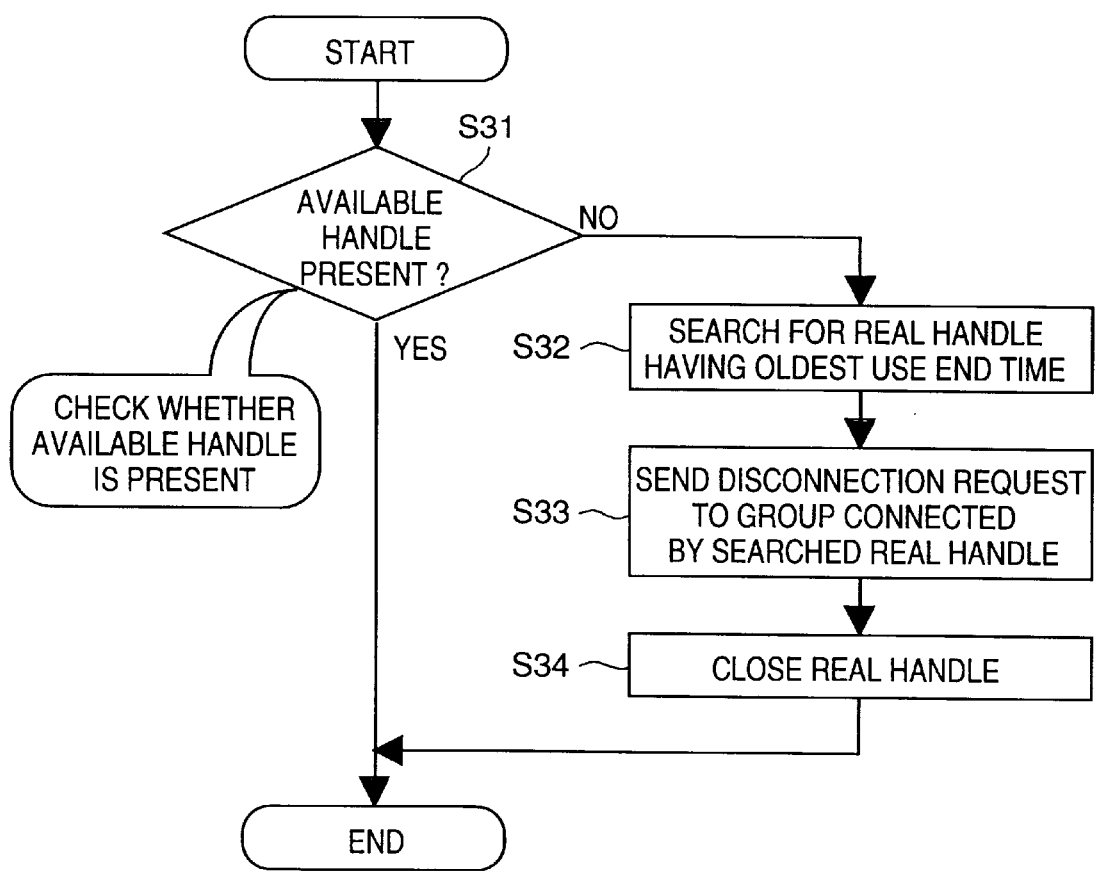
FIG. 10 is a flow chart showing a real handle determination processing sequence.

If connection processing is requested, real handle determination processing shown in FIG. 10 is executed in step S17. In step S18, the real handle is opened, and at the same time, a connection request acknowledgement is returned to the group (connection source) which has issued the connection request. In step S19, the virtual handle is assigned to the corresponding program. The program represented by the connection request is started in step S20, and then the flow returns to the main processing.

The program end and start processing operations in steps S16 and S20 are executed by any other program module on the basis of the request from the controller 202.

Real Handle Determination Processing

Referring to FIG. 10, it is determined in step S31 whether an available handle is present. If YES in step S31, the flow directly returns to connection processing. If NO in step S31, for example, a real handle whose last communication end time is the oldest is searched in step S32. In step S33, a disconnection request to a group connected by the searched real handle is sent. In step S34, this real handle is closed, and the flow returns to connection processing.

More specifically, an available handle is required to perform connection processing. If no available handle is present, an appropriate real handle must be found, and a connection using this handle must be closed. The above case has exemplified that the appropriate real handle is found on the basis of the final communication end time. The present invention, however, is not limited to this. For example, an appropriate real handle can be found in accordance with a statistical technique such as a method based on a connection traffic or a method based on the actual use frequency of the connection.

Input/Output Handle Determination Processing

Referring to FIG. 11, it is determined in step S41 whether input or output is to be performed. If the input is to be performed, a real handle having, e.g., the smallest number, is selected from the input enable real handles in step S42. If the output is to be performed, a real handle having, e.g., the smallest number, is selected from the output enable real handles. The flow then returns to the main processing.

The above case has exemplified that real handles are selected in the ascending order of handle numbers. The present invention, however, is not limited to this. The real handles may be selected in the descending order of the handle numbers. Alternatively, for the input, the real handles may be selected in the ascending order of the handle numbers, and for the output, the real handles may be selected in the descending order of the handle numbers.

Handle Assignment Processing

Referring to FIG. 12, it is determined in step S51 whether a real handle used for a connection with a connection destination group is present. If YES in step S51, this real handle is released (disconnected from the corresponding virtual handle) in step S52. In step S53, the released real handle is made to correspond to the virtual handle corresponding to data to be transmitted, and the flow returns to the main processing.

If no real handle used for the connection with the connection destination group is present, it is determined in step S54 whether an unconnected real handle is present. If YES in step S54, a connection request is sent to the data transmission destination group. In step S54, the unconnected real handle is opened, and the flow returns to the main processing.

Figure 13:
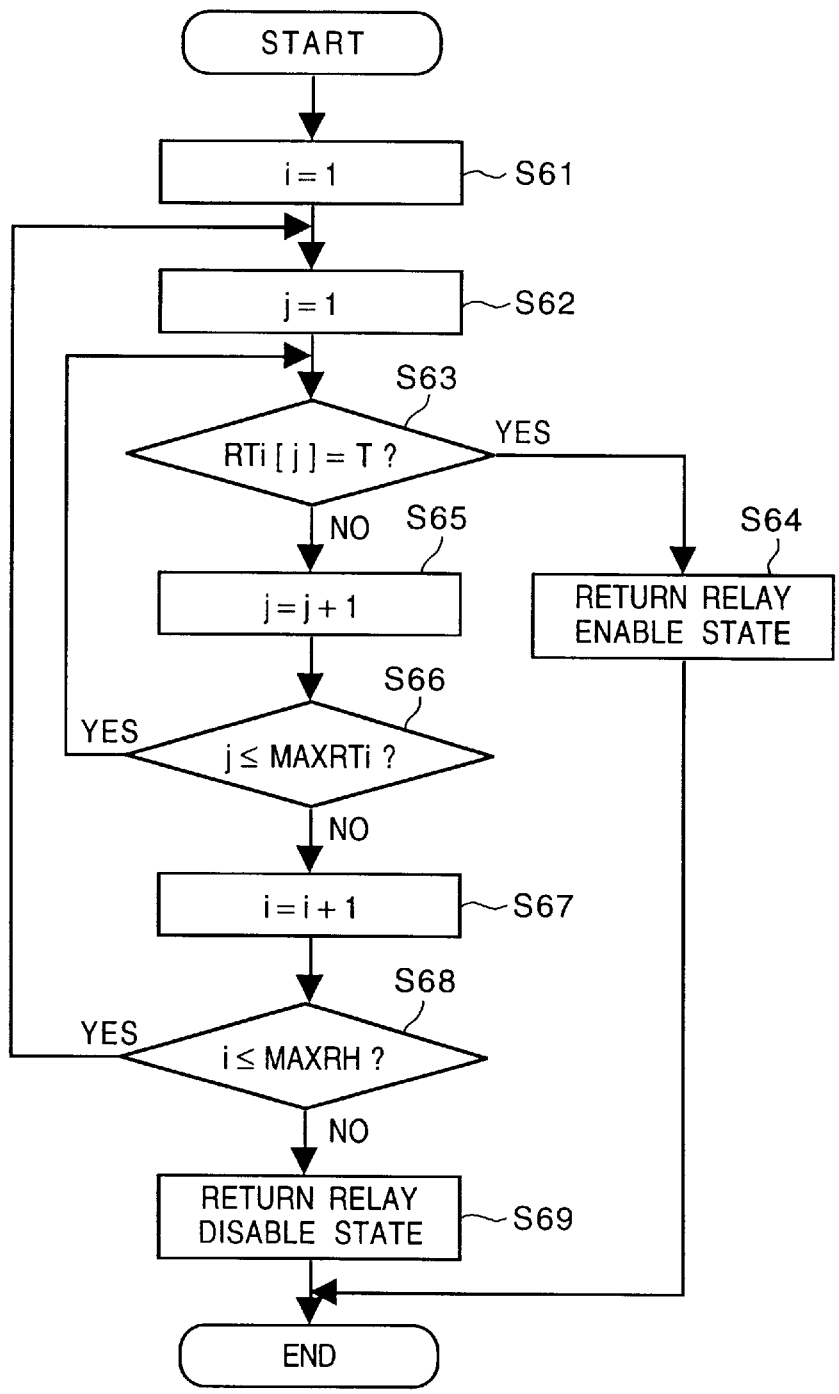
FIG. 13 is a flow chart showing a relay possibility check processing sequence.

If no unconnected real handle is available, relay possibility check processing shown in FIG. 13 is executed in step S57. The relay possibility is determined in step S58. If YES in step S58, the flow advances to step S59 to send a relay request to any other group (i.e., the group which requests a relay connection), and the flow returns to the main processing. If no relay possibility is detected, real handle determination processing shown in FIG. 10 is executed in step S60, and the flow advances to step S55.

Relay Possibility Check Processing

In relay possibility check processing shown in FIG. 13, connection tables obtained by dividing the above-described connection table in units of real handles are used. That is, with reference to FIG. 7, the connection table of the real register R1 becomes RT1={3, 4}. The connection table of the real register R4 becomes RT4={2, 5, 10}.

Referring to FIG. 13, a counter i is initialized (i=1) in step S61, and a counter j is initialized (j=1) in step S62. It is determined in step S63 whether the jth entry RTi[j] of the real handle Ri in the connection table RTi coincides with a number T of a group to be connected. If RTi[j]=T, then the flow advances to step S64.

If RTi[j]≠T, the counter j is incremented in step S65. In step S66, j is compared with a magnitude MAXRTi of RTi. If j≦MAXRTi, the flow returns to step S63; otherwise, the flow advances to step S67. In step S67, the counter i is incremented. In step S68, i is compared with the number MAXRH of real handles. If i≦MAXRH, the flow returns to step S62; otherwise, the flow advances to step S69.

The connection tables of all the real handles are checked to determine whether the number T of the group to be connected is contained in these connection tables. If the number T is contained in these connection tables, a relay enable state is returned in step S64; otherwise, a relay disable state is returned. The flow returns to handle assignment processing.

As described above, according to this embodiment, a large number of file handles can be virtually prepared regardless of the limitations of OS file handles. Even in constructing systems for performing many-to-many communications, the file handles will not be short, and the number of processes to be started is not limited to a specific one.

In addition, the correspondence between a given virtual handle and a real handle is canceled while leaving the correspondence between a program and the given virtual handle. This real handle is made to correspond to another virtual handle, and this correspondence is used by another program. A relay connection can be easily realized.

In addition, the communication control unit 201 of this embodiment performs processing such as unique queuing, and processing such as retransmission need not be performed on the application side. Therefore, the description of an application program or the like can be facilitated.

Further, the number of file handles actually used can be minimized. Therefore, the load on the OS can be reduced, and the operations of the information processing apparatus and the system as a whole can be performed at high speed.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus connected to a network, said apparatus comprising:

first management means for managing first handles used in communication with any other apparatus connected to said network where the number of the first handles is limited; and second management means for generating and assigning a second handle in response to a request of an arbitrary computer program running on said apparatus and managing a correspondence between the first and second handles, wherein when a computer program assigned the second handle requires communication, said second management means corresponds the second handle, which has been assigned to the required computer program, to one of the first handles which is available.

2. The apparatus according to claim 1, wherein said second management means assigns the second handle to a computer program designated from any other apparatus connected to said network.

3. The apparatus according to claim 2, wherein the program to which the second handle is assigned uses the correspondence between the first and second handles which is managed by the second management means, thereby communicating with the computer program running on any other apparatus connected to said network.

4. The apparatus according to claim 1, wherein said second management means changes the correspondence between the first and second handles to eliminate a shortage of the first handles.

5. The apparatus according to claim 1, wherein said second management means requests a relay connection to any other apparatus whose connection is already established, in order to establish a connection with a desired apparatus, when no unused first handle is available.

6. The apparatus according to claim 1, wherein said second management means makes the first handles correspond to each other when a relay connection is requested from any other apparatus whose connection is already established.

7. The apparatus according to claim 1, wherein said second management means dynamically manages the second handle.

8. A communication method of an information processing apparatus connected to a network, said method comprising the steps of:

managing first handles used in communication with any other apparatus connected to said network where the number of the first handles is limited;

generating and assigning a second handle in response to a request of an arbitrary computer program running on said apparatus;

managing a correspondence between the first and second handles; and when a computer program assigned the second handle requires communication, corresponding the second handles, which has been assigned to the required computer program, to one of the first handles which is available.

9. An information processing system having a plurality of information processing apparatuses which are connected to a network, each of said plurality of information processing apparatuses comprising:

first management means for managing first handles used in a communication with any other apparatus connected to said network where the number of the first handles is limited; and second management means for generating and assigning a second handle in response to a request of an arbitrary computer program running on said apparatus, and managing a correspondence between the first and second handles, wherein a computer program assigned the second handle requires communication, said second management means corresponds the second handle, which has been assigned to the required computer program, to one of the first handles which is available.

10. The system according to claim 9, wherein said second management means assigns the second handle to a computer program designated from any other apparatus connected to said network.

11. The system according to claim 10, wherein the program to which the second handle is assigned uses the correspondence between the first and second handles which is managed by the second management means, thereby communicating with the computer program running on any other apparatus connected to said network.

12. The system according to claim 9, wherein said second management means changes the correspondence between the first and second handles to eliminate a shortage of the first handles.

13. The system according to claim 9, wherein said second management means requests a relay connection to any other apparatus whose connection is already established, in order to establish a connection with a desired apparatus, when no unused first handle is available.

14. The system according to claim 9, wherein said second management means makes the first handles correspond to each other when a relay connection is requested from any other apparatus whose connection is already established.

15. The system according to claim 9, wherein said second management means dynamically manages the second handle.

16. A computer program product comprising a computer-usable medium having computer-readable program code means embodied in said medium for a communication method of an information processing apparatus connected to a network, said product comprising:

first computer-readable program code means for managing first handles used in communication with any other apparatus connected to said network where the number of the first handles is limited;

second computer-readable program code means for generating and assigning a second handle in response to a request of an arbitrary computer program running on said apparatus; and third computer-readable program code means for managing a correspondence between the first and second handles, and when a computer program assigned the second handle requires communication, corresponding the second handle, which requires communication, corresponding the second handle, which has been assigned to the required computer program, to one of the first handles which is available.

* * * * *

UNITED STATES PATENT AND TRADEMARK OFFICE
CERTIFICATE OF CORRECTION

PATENT NO. : 5,995,964
DATED : November 30, 1999
INVENTOR(S) : Tsuyoshi Hoshina et al It is certified that error appears in the above-identified patent and that said Letters Patent is hereby corrected as shown below:

On the title page: Item [75], delete "Hoshiina" and insert --Hoshina--.

In Column 7, line 43, delete "$\underline{\leq}$" and insert --$\leq$--.

In Column 7, line 46, delete "$\underline{\leq}$" and insert --$\leq$--.

Signed and Sealed this

Thirtieth Day of January, 2001

Attest:

Attesting Officer

Q. TODD DICKINSON
Director of Patents and Trademarks